(12) United States Patent  (10) Patent No.: US 8,185,171 B2
Kim  (45) Date of Patent: *May 22, 2012

(54) SWING TYPE COVER OPENING AND CLOSING DEVICE FOR MOBILE PHONE

(75) Inventor: Yong-Yeon Kim, Gyeonggi-do (KR)

(73) Assignee: Prexco Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/002,472

(22) PCT Filed: Sep. 1, 2008

(86) PCT No.: PCT/KR2008/005121
§ 371 (c)(1),
(2), (4) Date: Jan. 3, 2011

(87) PCT Pub. No.: WO2010/002066
PCT Pub. Date: Jan. 7, 2010

(65) Prior Publication Data
US 2011/0105202 A1    May 5, 2011

(30) Foreign Application Priority Data
Jul. 4, 2008    (KR) .................. 10-2008-0065089

(51) Int. Cl.
*H04M 1/00*    (2006.01)
(52) U.S. Cl. .................. 455/575.3; 455/575.1
(58) Field of Classification Search ............... 455/575.3, 455/575.1
See application file for complete search history.

(56) References Cited

U.S. PATENT DOCUMENTS 7,231,188 B2    6/2007 Godston et al.
(Continued)

FOREIGN PATENT DOCUMENTS

EP    1777924 A1    4/2007
(Continued)

OTHER PUBLICATIONS

"Application Serial No. PCT/KR2008/005121, International Search Report mailed Mar. 25, 2009", 3 pgs.
(Continued)

*Primary Examiner* — Charles Shedrick
(74) *Attorney, Agent, or Firm* — Schwegman, Lundberg & Woessner, P.A.

(57) ABSTRACT

A swing-type cover opening and closing device for a mobile phone according to an exemplary embodiment of the invention includes: i) a main body case that is disposed in a main body of the mobile phone and has a through-hole formed at one side thereof; ii) a cover case that is disposed in a cover of the mobile phone, has a hollow shaft penetrating the through-hole integrally projecting thereon, and is pivotably mounted on the main body case; and iii) an elastic unit of which both ends are pivotably joined to the main body case and the cover case, respectively, to provide elastic force to the cover case by rotation of the cover case, wherein the elastic unit includes a housing that is pivotably connected to the main body case through a first hinge pin, a slide member that is joined to the inside of the housing to be slidable and lockable, and is connected to the cover case through a second hinge pin, and a plurality of spring members that are installed in the housing and apply elastic force to the slide member.

15 Claims, 10 Drawing Sheets

U.S. PATENT DOCUMENTS

| | | | |
|---|---|---|---|
| 7,419,099 B2 * | 9/2008 | Lee et al. | 235/472.01 |
| 7,866,000 B2 * | 1/2011 | Lee et al. | 16/334 |
| 2005/0202856 A1 * | 9/2005 | Park et al. | 455/575.1 |
| 2011/0111812 A1 | 5/2011 | Kim | |

FOREIGN PATENT DOCUMENTS

| | | |
|---|---|---|
| JP | 2005-121095 A | 5/2005 |
| JP | 2005-534237 A | 11/2005 |
| KR | 20-0387277 Y1 | 6/2005 |
| KR | 10-2006-0004447 B1 | 1/2006 |
| KR | 20-0408523 Y1 | 2/2006 |
| KR | 10-2006-0033298 A | 4/2006 |
| KR | 10-2006-0054605 A | 5/2006 |
| KR | 20-0416846 Y1 | 5/2006 |
| KR | 20-0419184 Y1 | 6/2006 |
| KR | 10-0699245 B1 | 3/2007 |
| KR | 10-0761663 B1 | 9/2007 |
| KR | 10-0768499 B1 | 10/2007 |
| KR | 10-0796725 B1 | 1/2008 |

OTHER PUBLICATIONS

"Application Serial No. PCT/KR2008/005121, Written Opinion mailed Mar. 25, 2009", 3 pgs.

"U.S. Appl. No. 13/002,481, Non Final Office Action mailed Oct. 13, 2011", 6 pgs.

"International Application Serial No. PCT/KR2008/005120, International Search Report mailed Apr. 3, 2009", 3 pgs.

"International Application Serial No. PCT/KR2008/005120, Written Opinion mailed Apr. 3, 2009", 4 pgs.

"Korean Application Serial No. 10-2008-0065087, Office Action mailed May 10, 2010", (w/ English Translation), 2 pgs.

"Korean Application Serial No. 10-2008-0065087, Response to Office Action mailed May 10, 2010", (English Translation), 2 pgs.

"Korean Application Serial No. 10-2008-0065089, Office Action mailed May 10, 2010", (English Translation), 2 pgs.

"Korean Application Serial No. 10-2008-0065089, Response filed to Office Action mailed May 10, 2010", (English Translation), 2 pgs.

* cited by examiner

SWING TYPE COVER OPENING AND CLOSING DEVICE FOR MOBILE PHONE

CROSS REFERENCE TO RELATED APPLICATION

This application is a nationalization under 35 U.S.C. 371 of PCT/KR2008/005121, filed Sep. 1, 2008 and published as WO 2010/002066 A1 on Jan. 7, 2010, which application claims priority to and the benefit of Korean Patent Application No. 10-2008-0065089, filed Jul. 4, 2008, which applications and publication are incorporated herein by reference in their entirety.

BACKGROUND OF THE INVENTION (a) Field of the Invention

Exemplary embodiments of the present invention relate to a swing-type cover opening and closing device for a mobile phone. More particularly, embodiments of the present invention relate to a swing-type cover opening and closing device for a mobile phone that can pivot a cover of the mobile phone in a semi-automated mode in a clockwise or counterclockwise direction.

(b) Description of the Related Art

Generally, portable terminals such as a mobile phone, a PDA, a notebook, a DMB phone, and the like are widely used in order to wirelessly use services such as communications and broadcasting in motion rather than at a fixed position.

The portable terminals are one kind of important necessities for obtaining convenience of life in the information age. In particular, mobile phones have come into wide use by elementary, middle, and high school students, and the aged.

As described above, as the demand and the number of users for portable terminals rapidly increases, consumers who use them continue to expect products with new designs and new functions.

The portable terminal includes a main body with a keypad and a cover including a liquid crystal display that are joined to each other to be openable and closable. In general, the portable terminal may be classified as a folder-type portable terminal, a hinge-type portable terminal, a sliding-type portable terminal, and a swing-type portable terminal.

Further, a digital multimedia broadcasting (DMB) services have been recently commercialized, a swing-type cover opening and closing device having a structure in which the cover is opened to the main body while being pivoted by a swing device formed between the main body and the cover in case of pivoting the cover to the main body at a predetermined angle so as to easily watch multimedia such as photographs and motion pictures has been largely popular with consumers.

However, as most swing-type cover opening and closing devices for the mobile phone in the related art are configured to open and close the cover in a semi-automated mode, due to a problem in that the size and thickness of a product and the number of components increases, the miniaturization and slimness of the mobile phone are hindered. Therefore, technology development is keenly required to solve the above-described problem.

Since the cover opening and closing device for the mobile phone in the related art generally has a structure in which the cover is opened and closed in the semi-automated mode by adopting a cam of a surface contact mode and an elastic member, an overall structure of the cover opening and closing device for the mobile phone is complicated, and opening and closing operations of the cover by the surface contact of the cam are not stable.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a swing-type cover opening and closing device for a mobile phone having advantages in that a cover thereof is smoothly and stably opened and closed, durability is improved, and slimness and weight reduction of the mobile phone can be implemented in a simple structure.

An exemplary embodiment of the present invention provides a swing-type cover opening and closing device for a mobile phone that includes: i) a main body case that is disposed in a main body of the mobile phone and has a through-hole formed at one side thereof; ii) a cover case that is disposed in a cover of the mobile phone, has a hollow shaft penetrating the through-hole integrally projecting thereon, and is pivotally mounted on the main body case; and an elastic unit of which both ends are pivotally joined to the main body case and the cover case, respectively, to provide elastic force to the cover case by rotation of the cover case.

The elastic unit includes a housing that is pivotably connected to the main body case through a first hinge pin, a slide member pivotably joined to the inside of the housing to be slidable and lockable, and being connected to the cover case through a second hinge pin, and a plurality of spring members that are installed in the housing and apply elastic force to the slide member.

In the swing-type cover opening and closing device for the mobile phone, a circular rail part forming a trajectory of 90 degrees or more may be formed on the periphery of the through-hole, and projections may be formed at both ends of the rail part in the main body case.

In the swing-type cover opening and closing device for the mobile phone, a protrusion-type stopper sliding on the rail part may be integrally disposed on the bottom surface of the cover case in correspondence with the rail part.

The swing-type cover opening and closing device for the mobile phone may further include a ring-shaped pivot support member that fits in the hollow shaft through the through-hole while being pivotably supported on the periphery of the bottom surface of the through-hole.

In the swing-type cover opening and closing device for the mobile phone, a mount in which the pivot support member fits may be formed in a circumferential direction of the hollow shaft of the cover case, and at least one key protrusion may be integrally formed in the mount.

In the swing-type cover opening and closing device for the mobile phone, a key groove joined to the key protrusion may be formed on the inner peripheral surface of the pivot support member.

In the swing-type cover opening and closing device for the mobile phone, a support rib supporting the outer periphery of the bottom surface of the through-hole may be integrally formed in the pivot support member.

In the swing-type cover opening and closing device for the mobile phone, a sliding groove to which the support rib is slidable is formed on the periphery of the bottom surface of the through-hole.

In the swing-type cover opening and closing device for the mobile phone, a mounting hole corresponding to a pivot trajectory of the housing may be formed in the main body case to be penetrated therethrough.

In the swing-type cover opening and closing device for the mobile phone, the main body case may further include an auxiliary stopper that controls a predetermined pivot angle of the cover case.

In this case, it is preferable that the auxiliary stopper is composed of both hole ends of the mounting hole.

In the swing-type cover opening and closing device for the mobile phone, the housing, which has a plate shape, may include a plurality of spring mounting grooves for mounting each spring member successively formed in a width direction thereof, a guide groove that is joined to the slide member while being connected with each spring mounting hole, and a slit-type locking hole connected with the guide groove formed on both sides thereof.

In the swing-type cover opening and closing device for the mobile phone, the slide member has the plate shape, which fits in the guide groove and may integrally include a pair of support pins that fit in each spring member mounted in the spring mounting groove at both sides of the housing.

In this case, a locking protrusion joined to the locking hole may be integrally formed in each support pin.

In the swing-type cover opening and closing device for the mobile phone, a first hinge hole and a second hinge hole for joining the first hinge pin may be formed in the main body case and the housing, respectively, and a third hinge hole and a fourth hinge hole for joining the second hinge pin may be formed in the cover case and the slide member.

In the swing-type cover opening and closing device for the mobile phone, it is preferable that the slide member is supported on the periphery of the top surface of the through-hole.

In the swing-type cover opening and closing device for the mobile phone, in order to move the cover case up in a case in which the cover case pivots at a predetermined angle, a first cam unit having a first cam surface may be integrally disposed on the outer periphery of the hollow shaft in the cover case.

In the swing-type cover opening and closing device for the mobile phone, a second cam unit having a second cam surface being in surface contact with the first cam surface may be disposed on the periphery of the top surface of the through-hole in correspondence with the first cam unit in the main body case.

In the swing-type cover opening and closing device for the mobile phone, in order to form a predetermined gap between the main body case and the cover case at the time of opening and closing the cover case, a third cam unit in which a top surface of the support rib is constituted by a third cam surface may be formed, and a fourth cam unit having a fourth cam surface being in surface contact with the third cam surface may be integrally disposed on the periphery of the bottom surface of the through-hole corresponding to the third cam unit.

In the swing-type cover opening and closing device for the mobile phone, a mount in which the pivot support member fits in the first cam unit is formed on the hollow shaft of the cover case and at least one key protrusion is integrally formed in the mount.

In this case, a key groove joined to the key protrusion may be formed on the inner periphery of the third cam unit in the pivot support member.

In the swing-type cover opening and closing device for the mobile phone, convex sections may be formed on the cam surface of each cam unit at an interval of 90 degrees, and concave sections may be formed between the convex sections.

BRIEF DESCRIPTION OF THE DRAWINGS

The accompanying drawings are referenced to describe exemplary embodiments of the present invention. Therefore, the technical spirit of the present invention should not be analyzed only on the basis of the accompanying drawings.

DETAILED DESCRIPTION OF THE EMBODIMENTS

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

Figure 1:
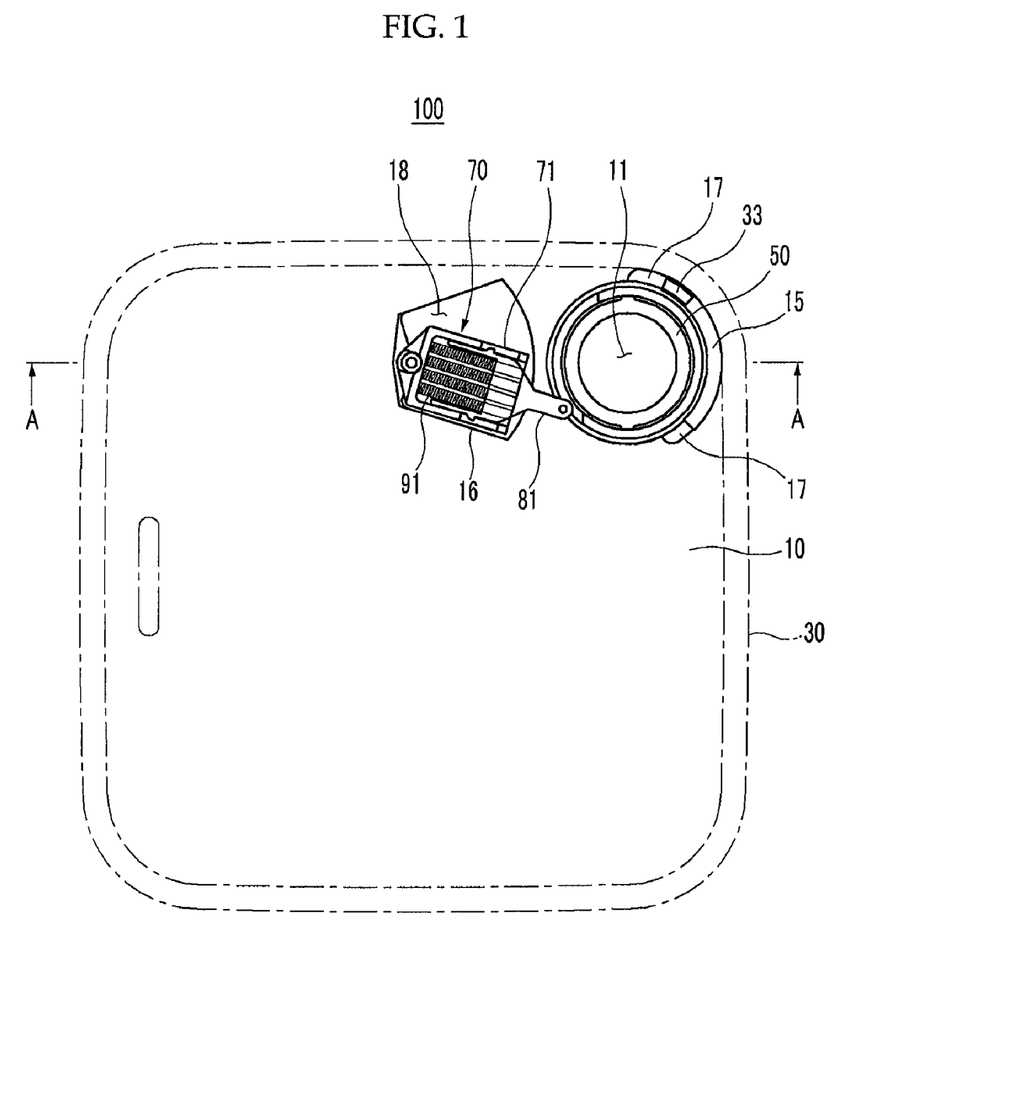
FIG. 1 is a plan view illustrating a swing-type cover opening and closing device according to an exemplary embodiment of the invention.
Figure 2:
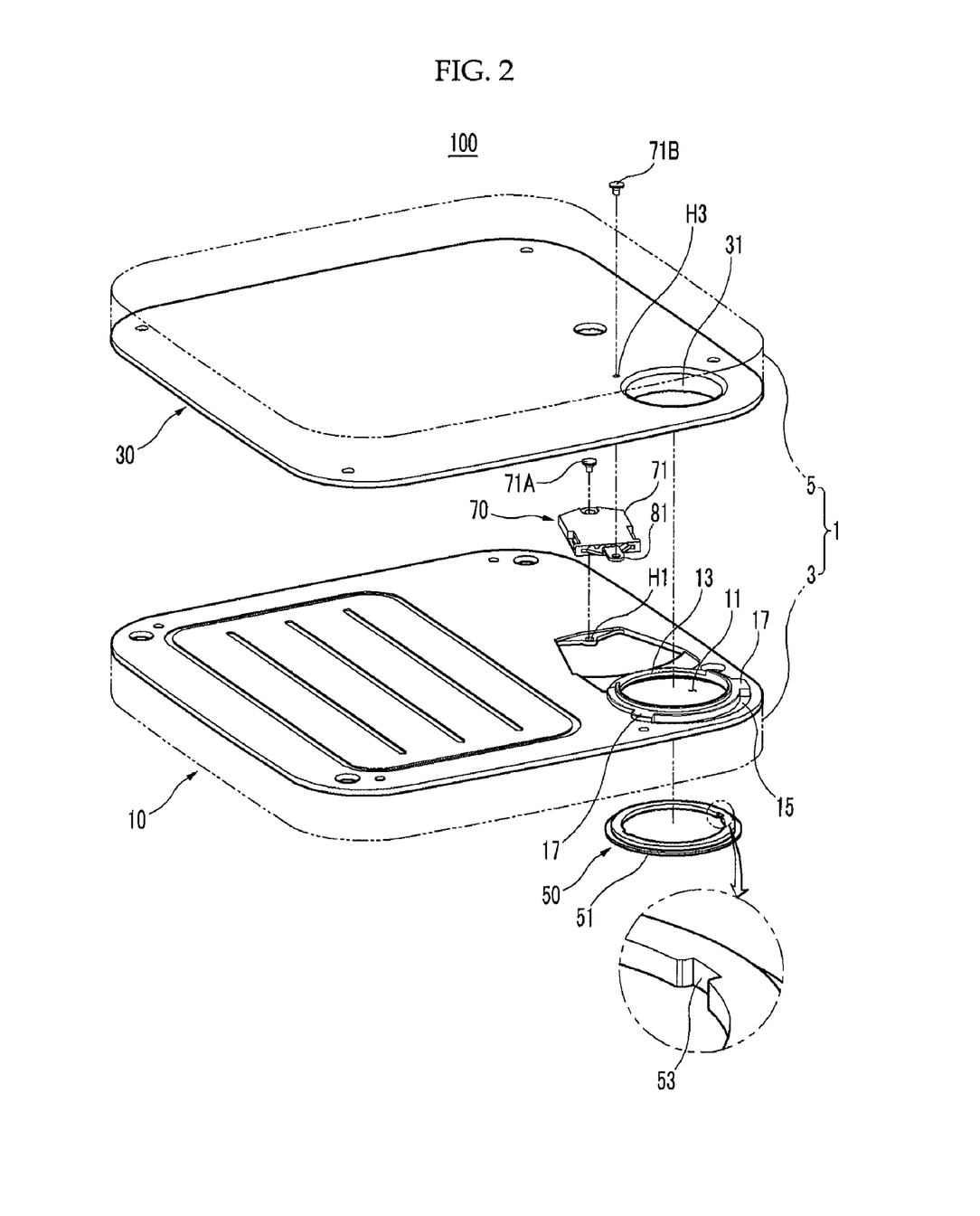
FIG. 2 is an exploded perspective view of a swing-type cover opening and closing device according to an exemplary embodiment of the invention.
Figure 3:
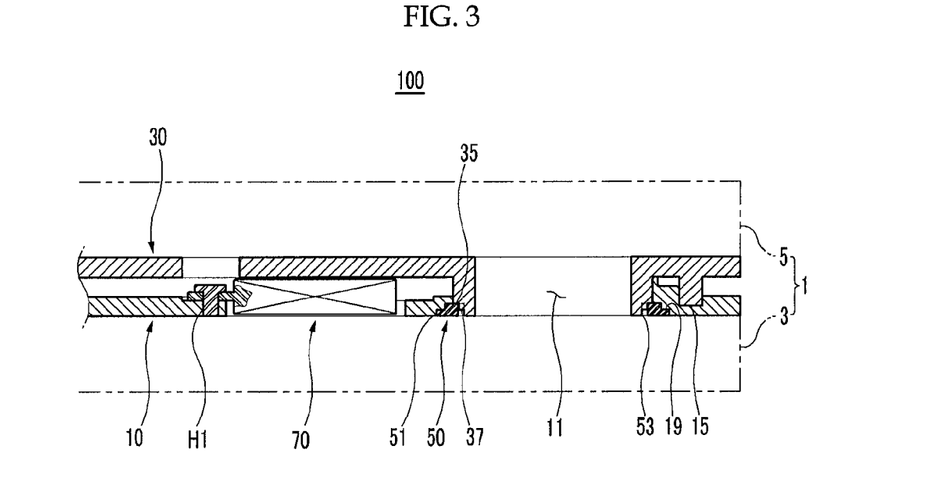
FIG. 3 is a cross-sectional view taken along line A-A of FIG. 1.

FIG. 1 is a plan view illustrating a swing-type cover opening and closing device according to an exemplary embodiment of the invention, FIG. 2 is an exploded perspective view of a swing-type cover opening and closing device according to an exemplary embodiment of the invention, and FIG. 3 is a cross-sectional view taken along line A-A of FIG. 1.

Referring to the figures, a portable terminal 1 adopting the swing-type cover opening and closing device 100 according to the present exemplary embodiment of the invention includes a mobile phone that includes a main body 3 with a keypad, etc., and a cover 5 with a display unit, as an example.

The portable terminal 1 has a structure in which the cover 5 can pivot at a predetermined angle in a clockwise or counterclockwise direction by the swing-type cover opening and closing device 100 according to the present exemplary embodiment.

The portable terminal 1 includes the main body 3 and the cover 5 each substantially having a square shape.

The swing-type cover opening and closing device 100 for the mobile phone according to the present exemplary embodiment is disposed at one edge (an upper edge of a standing mobile phone) between the main body 3 and the cover 5.

Herein, the swing-type cover opening and closing device 100 according to the present exemplary embodiment of the invention is not particularly limited to the above-described mobile phone, and may be adopted in various portable terminals such as a PDA, a PMP, a DMB, etc.

The swing-type cover opening and closing device 100 for the mobile phone includes components that have improved durability, that enable the cover 5 to be smoothly and stably opened and closed, that allow the cover 5 to pivot in a semi-automated mode, and that implement the slimness and weight reduction of the mobile phone 1 in a simple structure.

The swing-type cover opening and closing device 100 for the mobile phone basically includes a main body case 10, a cover case 30, a pivot support member 50, and an elastic unit 70. Hereinafter, each of the components will be described in detail.

In the present exemplary embodiment, the main body case 10 has a plate shape and is disposed in the main body 3 of the portable terminal 1.

The main body case 10 has a through-hole 11 at an upper edge of a front surface (a surface of the standing main body case) thereof.

The through-hole 11 is constituted as a circular aperture that allows a hollow shaft 31 of the cover case 30 to be penetrated therethrough, as described below.

Figure 4:
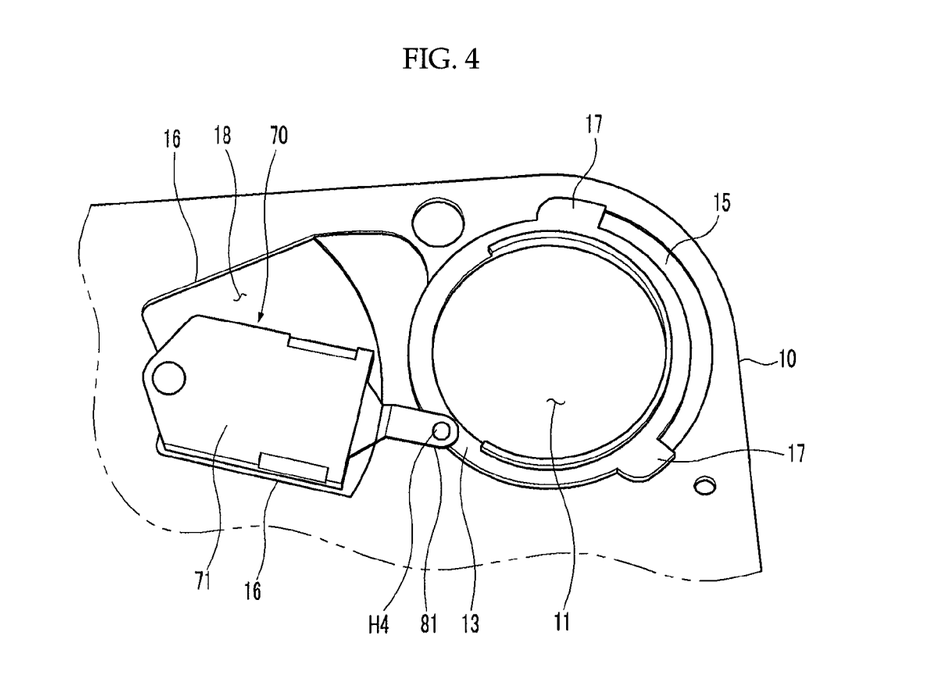
FIG. 4 is a perspective view illustrating a top surface of a body case adopted in a swing-type cover opening and closing device according to an exemplary embodiment of the invention.

As shown in FIG. 4, the main body case 10 has a peripheral protrusion 13 having a predetermined width, which projects at the periphery of the through-hole 11 on the top surface thereof.

Further, a first hinge hole H1 for pivotably hinge-joining one end of the elastic unit 70 described below is disposed in the main body case 10.

Moreover, it is apparent that a plurality of fastening holes (not shown) are disposed in the main body case 10 in order to configure the main body 3 of the portable terminal 1 for installing the keypad, etc., in the main body case 10 by means of fastening members (not shown) such as bolts, rivets, etc.

In addition, in the main body case 10, a circular rail part 15 forms a pivot trajectory of at least 90 degrees or more and preferably a pivot trajectory of 90 degrees outside of the peripheral protrusion 13.

Herein, the rail part 15 has a groove shape while forming a circular arc corresponding to the peripheral protrusion 13. Projections 17 are disposed at both ends of the rail part 15.

Figure 5:
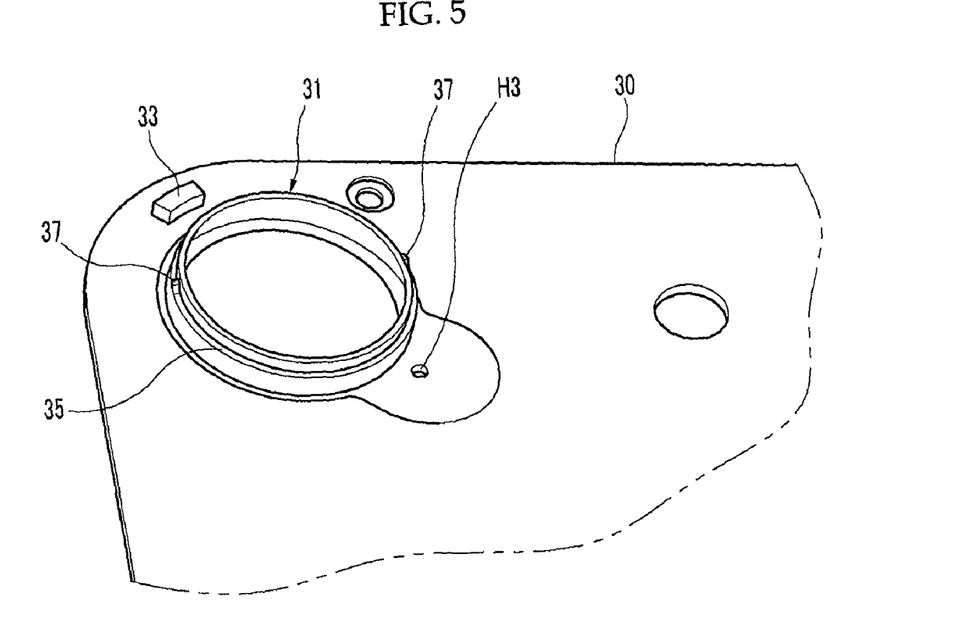
FIG. 5 is a perspective view illustrating a top surface of a main body case adopted in a swing-type cover opening and closing device according to an exemplary embodiment of the invention.

In the present exemplary embodiment, the cover case 30 has the plate shape and is disposed in the cover 5 of the portable terminal 1.

As shown in FIG. 5, in the cover case 30, the circular hollow shaft 31 integrally projects on the upper edge of the front surface (the surface of the standing cover case) rearward in correspondence with the through-hole 11 of the main body case 10.

The hollow shaft 31 is formed to penetrate the through-hole 11 of the main body case 10.

Accordingly, the cover case 30 can be mounted onto the main body case 10 through the hollow shaft 31 to be substantially pivotable.

The cover case 30 has a stopper 33 corresponding to the rail part 15 of the main body case 10, which is disposed on the bottom surface thereof.

The stopper 33 projects outside of the periphery of the hollow shaft 31 by being integrated with the cover case 30. The stopper slides on the rail part 15 while being joined to the rail part 15 by rotation of the cover case 30.

When the cover case 30 pivots, the stopper 33 is suspended on the projections 17 at both ends of the rail part 15 while sliding on the rail part 15, thereby preventing the cover case 30 from pivoting past a predetermined pivot angle (preferably 90 degrees).

Further, a third hinge hole H3 for pivotably hinge-joining the other end of the elastic unit 70 described below is disposed in the cover case 30.

Herein, it is apparent that a plurality of fastening holes (not shown) are disposed in the cover case 30 in order to configure the cover 5 of the portable terminal 1 by installing the display unit, etc., in the cover case 30 by means of fastening members (not shown) such as the bolts, the rivets, etc.

In the present embodiment, the pivot support member 50 (also generally referred to as "washer" in the industry relating to the art) serves to pivotably join the main body case 10 and the cover case 30 to each other while pivotably supporting the cover case 30 on the main body case 10.

The pivot support member 50 has a ring shape to fit in the hollow shaft 31 of the cover case 30 through the through-hole 11 of the main body case 10 with being pivotably supported on the main body case 10.

Figure 6:
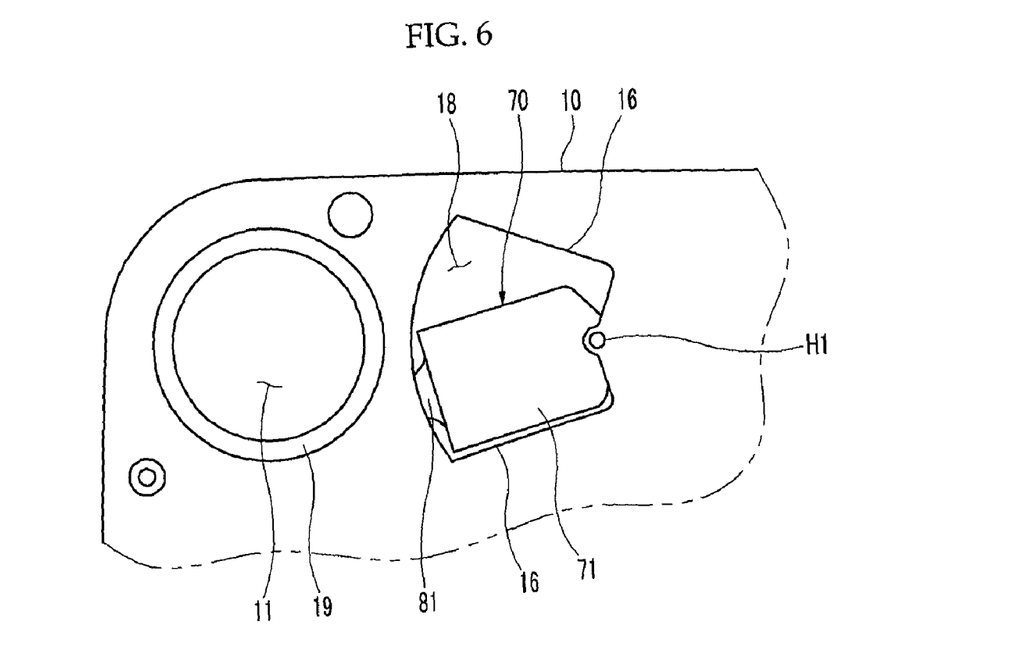
FIG. 6 and FIG. 7 are perspective views illustrating a bottom surface of a main body case adopted in a swing-type cover opening and closing device according to an exemplary embodiment of the invention.
Figure 7:
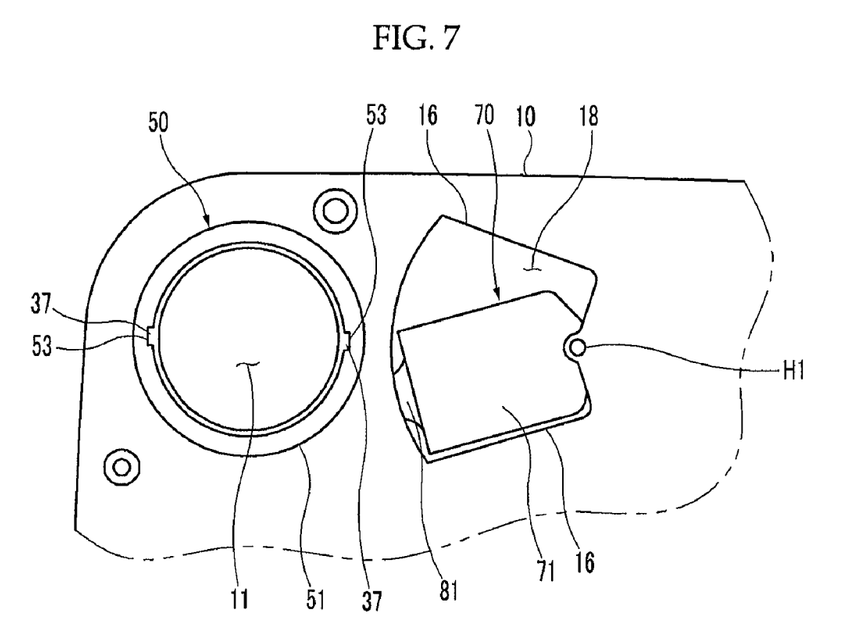

As shown in FIG. 6 and FIG. 7, the pivot support member 50 is pivotably supported on the periphery of the through hole 11 while fitting in the through-hole 11 on the bottom surface of the main body case 10.

Therefore, the pivot support member 50 is integrated with a support rib 51 that supports the periphery of the through-hole 11 at a bottom periphery thereof and projects outside of a concentric circle of the pivot support member 50.

Further, a sliding groove 19 that is joined to the support rib 51 of the pivot support member 50 and to which the support rib 51 can slide is disposed at the periphery of the through-hole 11.

The pivot support member 50 press-fits in the hollow shaft 31 of the cover case 30 through the through-hole 11 of the main body case 10.

That is, the pivot support member 50 pivots with the cover case 30 by fitting in the hollow shaft 31 of the cover case 30 with the support rib 51 thereof pivotably supported on the sliding groove 19.

As described above, in order to fit the pivot support member 50 in the hollow shaft 31 of the cover case 30, a mount 35, as a step, in which the pivot support member 50 fits, is disposed on the hollow shaft 31 thereof in a circumferential direction of the hollow shaft 31 (refer to FIG. 5).

In the present embodiment, position fixing members 37 and 53 for constantly maintaining the position of the pivot support member 50 while fixing the pivot support member 50 to the mount 35 are installed in the mount 35 of the hollow shaft 31 and the pivot support member 50.

The position fixing members 37 and 53 include at least one key protrusion 37 that integrally projects on the mount 35 of the hollow shaft 31, and a key groove 53 (refer to FIG. 2) that is formed on the inner peripheral surface of the pivot support member 50 in correspondence with the key protrusion 37.

A pair of key protrusions 37 are formed on the mount 35 of the hollow shaft 31. The key protrusions 37 are arranged at 180 degrees to each other on the basis of the center of the hollow shaft 31.

The key groove 53 is composed of slits joined to the key protrusions 37.

In the present exemplary embodiment, the elastic unit 70 serves to provide elastic force to the cover case 30 by pivoting the cover case 30 while being supported on the main body case 10.

That is, as a user applies force to the cover case 30 until the cover case 30 pivots in a predetermined section, the elastic unit 70 allows the elastic force to be provided to the cover case 30 and allows the cover case 30 to automatically pivot by the elastic force in the other section.

Both ends of the elastic unit 70 are pivotably joined to the first hinge hole H1 of the main body case 10 and the third hinge hole H3 of the cover case 30, respectively.

Figure 8:
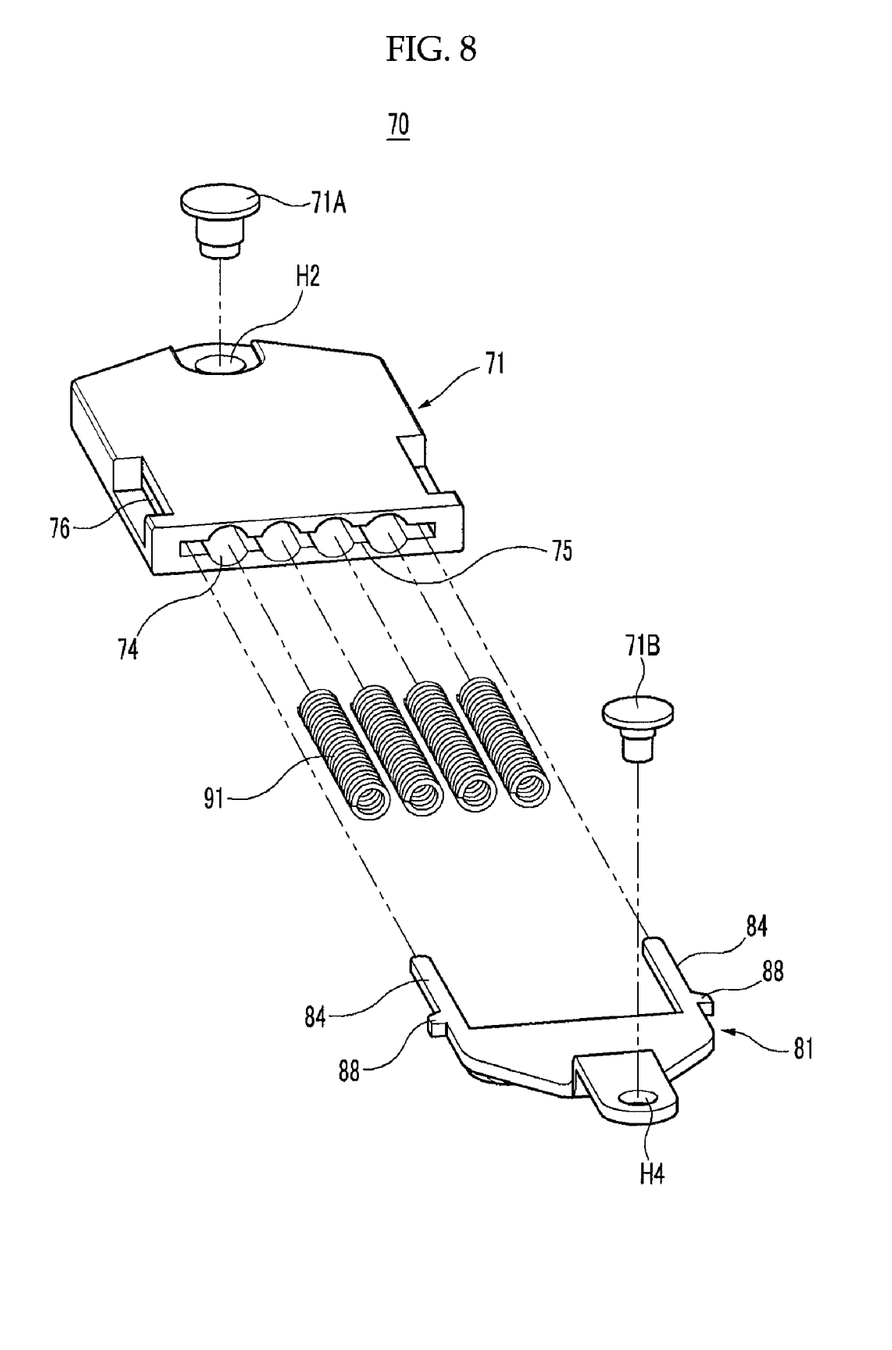
FIG. 8 is an exploded perspective view illustrating the configuration of an elastic unit adopted in a swing-type cover opening and closing device according to an exemplary embodiment of the invention.

As shown in FIG. 8, the elastic unit 70 includes a housing 71, a slide member 81, and a plurality of spring members 91.

Herein, the housing 71 is pivotably connected to the first hinge hole H1 of the main body case 10.

The slide member 81 is joined to the inside of the housing 71 to be slidable and lockable while being pivotably connected to the third hinge hole H3 of the cover case 30.

The spring members 91 are installed in the housing 71.

Hereinafter, the components of the elastic unit 70 will be described in detail. First, the housing 71 has an overall exterior of a plate shape and is pivotably connected to the first hinge hole H1 of the main body case 10 through a first hinge pin 71A.

A second hinge hole H2 to which the first hinge pin 71A can be joined through the first hinge hole H1 of the first hinge hole 10 is disposed at one end of the housing 71.

In the present exemplary embodiment, the housing 71 is pivotably installed while forming a trajectory of 90 degrees around a hinge point positioned on the same line as the center of the through-hole 11 of the main body case 10, i.e., a point where the first hinge pin 71A fits in the hinge holes H1 and H2 in a state in which the first hinge hole H1 of the main body case 10 and the second hinge hole H2 of the housing 71 coincide with each other.

A plurality of spring mounting grooves 74 for mounting the spring members 91 are successively formed to the inside from the other end of the housing 71 in a width direction.

Preferably, the spring mounting grooves 74 are formed at four locations at predetermined intervals in the width direction in the housing 71.

Further, guide grooves 75 in which the slide member 81 can be inserted while being interconnected to the spring mounting grooves 74 are disposed in the housing 71.

The guide grooves 75 are interconnected with the spring mounting grooves 74 in the width direction of the housing 71 and extend to both side parts of the housing 71.

Furthermore, slit-type locking holes 76 connected to the guide grooves 75 are formed on both sides of the housing 71.

In the present exemplary embodiment, the slide member 81 has the plate shape to be inserted into the guide grooves 75 from the other end of the housing 71.

In a state in which the slide member 81 is mounted to the guide grooves 75 and the locking holes 76 of the housing 71 to be slidable and lockable, respectively, the end of the slide member 81 is hinge-joined to the third hinge hole H3 of the cover case 30.

Therefore, a fourth hinge hole H4 to which a second hinge pin 71B is joined through the third hinge hole H3 of the cover case 30 is formed at the end of the slide member 81.

Herein, the slide member 81 is supported on a top surface of the peripheral protrusion 13 of the main body case 10 with the slide member 81 pivotably connected to the cover case 30 (refer to FIG. 4).

A pair of support pins 84 that fit in each of the spring members 91 mounted in the spring mounting grooves 74 at both sides of the housing 71 are integrally formed in the slide member 81.

Herein, a locking protrusion 88 that can be locked in the locking hole 76 by the elastic force of the spring member 91 applied to the slide member 81 is formed in each of the support pins 84 by fitting in the locking hole 76 of the housing 71.

As described above, each of the spring members 91 serves to apply the elastic force to the slide member 81 while fitting in the spring mounting groove 74 of the housing 71.

It is preferable that the spring member 91 is composed of a compression coil spring in the present exemplary embodiment.

Meanwhile, a mounting hole 18 corresponding to the pivot trajectory of the housing 71 is formed in the main body case 10 according to the present exemplary embodiment in correspondence with the housing 71 of the elastic unit 70 (refer to FIG. 4).

That is, the mounting hole 18 is formed by cutting a part of the main body case 10 corresponding to the pivot trajectory of the housing 71. Therefore, the housing 71 pivots while forming the pivot trajectory of 90 degrees in an internal area of the mounting hole 18.

As described above, a reason why the mounting hole 18 corresponding to the pivot trajectory of the housing 71 is formed in the main body case 10 is to decrease the thickness of the main body case 10 as much as the thickness of the housing 71.

On the other hand, the main body case 10 according to the present exemplary embodiment further includes an auxiliary stopper 16 for auxiliarily controlling the predetermined pivot angle (90 degrees) of the cover case 30.

Such an auxiliary stopper 16 serves to assist a function of the above-described stopper 33 and is composed of both hole ends of the mounting hole 18.

Hereinafter, an assembly sequence and an operation process of the swing-type cover opening and closing device 100 for the mobile phone according to the exemplary embodiment of the invention will be described in detail.

The assembly sequence of the swing-type cover opening and closing device 100 for the mobile phone according to the present exemplary embodiment of the invention will now be described. First, in the present exemplary embodiment, the elastic unit 70 is mounted on the main body case 10, and the first hinge pin 71A fits in the first and second hinge holes H1 and H2 in a state in which the first hinge hole H1 of the main body case 10 and the second hinge hole H2 of the housing 71 coincide with each other.

At this time, the housing 71 of the elastic unit 70 is pivotable in the internal area of the mounting hole 18 on the trajectory of the predetermined angle (90 degrees) around the first hinge pin 71A while being positioned in the internal area of the mounting hole 18 of the main body case 10. Accordingly, in the present exemplary embodiment, the thickness of the main body case 10 of as much as the thickness of the housing 71 can be reduced by mounting the housing 71 of the elastic unit 70 in the mounting hole 18, such that the overall thickness of the device 100 is reduced. Ultimately, it is possible to achieve the slimness and weight reduction of the portable terminal 1.

The slide member 81 of the elastic unit 70 is supported on the top surface of the peripheral protrusion 13 of the main body case 10.

Next, in the present exemplary embodiment, the pivot support member 50 fits in the through-hole 11 on the bottom surface of the main body case 10. In this case, the support rib 51 of the pivot support member 50 is joined to the sliding groove 19 at the periphery of the through-hole 11.

Subsequently, the hollow shaft 31 of the cover case 30 is inserted into the through-hole 11 of the main body case 10 and the hollow shaft 31 press-fits in the pivot support member 50.

In such a process, when the pivot support member 50 fits in the mount 35 of the hollow shaft 31, the hollow shaft 31 of the cover case 30 is joined to the pivot support member 50 by joining the key protrusion 37 of the mount 35 to the key groove 53 of the pivot support member 50.

Accordingly, in the present exemplary embodiment, simultaneously, when the pivot support member 50 fits in the hollow shaft 31 of the cover case 30, the pivot support member 50 is mounted on the mount 35 of the hollow shaft 31 while the key protrusion 37 of the mount 35 is joined to the key groove 53. Therefore, the pivot support member 50 can be fixed to the hollow shaft 31 and the position of the pivot support member 50 can be constantly maintained.

In a state in which the support rib 51 of the pivot support member 50 is supported on the sliding groove 19 of the main body case 10, the pivot support member 50 fits in the hollow shaft 31 of the cover case 30, such that the pivot support member 50 pivots altogether with the cover case 30.

In this process, in the present exemplary embodiment, the stopper 33 of the cover case 30 is positioned in the rail part 15 of the main body case 10, and the third hinge hole H3 of the cover case 30 and the fourth hinge hole H4 of the slide member 81 coincide with each other.

Lastly, in this state, when the second hinge pin 71B fits in the third hinge hole H3 and the fourth hinge hole H4, assembling the swing-type cover opening and closing device 100 for the mobile phone according to the present exemplary embodiment is completed.

In this state, when the main body 3 is configured by installing the keypad, etc. in the main body case 10, and the cover 5 is configured by installing the display unit, etc. in the cover case 30, mounting the swing-type cover opening and closing device 100 according to the present exemplary embodiment on the portable terminal 1 is completed.

As known through the above-described assembling process, in the swing-type cover opening and closing device 100 for the mobile phone according to the present exemplary embodiment, the component for pivoting the cover 5 of the portable terminal 1 is integrally formed in the main body case 10 and the cover case 30, and the elastic unit 70 is disposed in the main body case 10, such that the overall thickness of the device 100 is reduced. Therefore, it is advantageous to make the portable terminal 1 slim and light, and it is easy to design the portable terminal 1.

Furthermore, the swing-type cover opening and closing device 100 for the mobile phone according to the present exemplary embodiment is integrally formed in the main body case 10 and the cover case 30, such that assemblability can be improved and manufacturing cost can be saved by minimizing the number of components.

The operation process of the swing-type cover opening and closing device 100 for the mobile phone according to an exemplary embodiment of the invention will now be described in detail with reference to the above-mentioned drawings and the below-mentioned drawings.

First, as shown in FIG. 1, when the cover 5 is completely closed to the main body 3 of the portable terminal 1, the elastic unit 70 slants in one direction with respect to a pivotal direction of the cover 5.

Herein, a comparatively small elastic force acts on the spring member 91 of the elastic unit 70 by the cover 5.

At this time, the stopper 33 of the cover case 30 is suspended on one projection 17 of the rail part 15 in the main body case 10.

The housing 71 of the elastic unit 70 is stopped in the auxiliary stopper 16 of the main body case 10, i.e., one hole end of the mounting hole 18.

Figure 9:
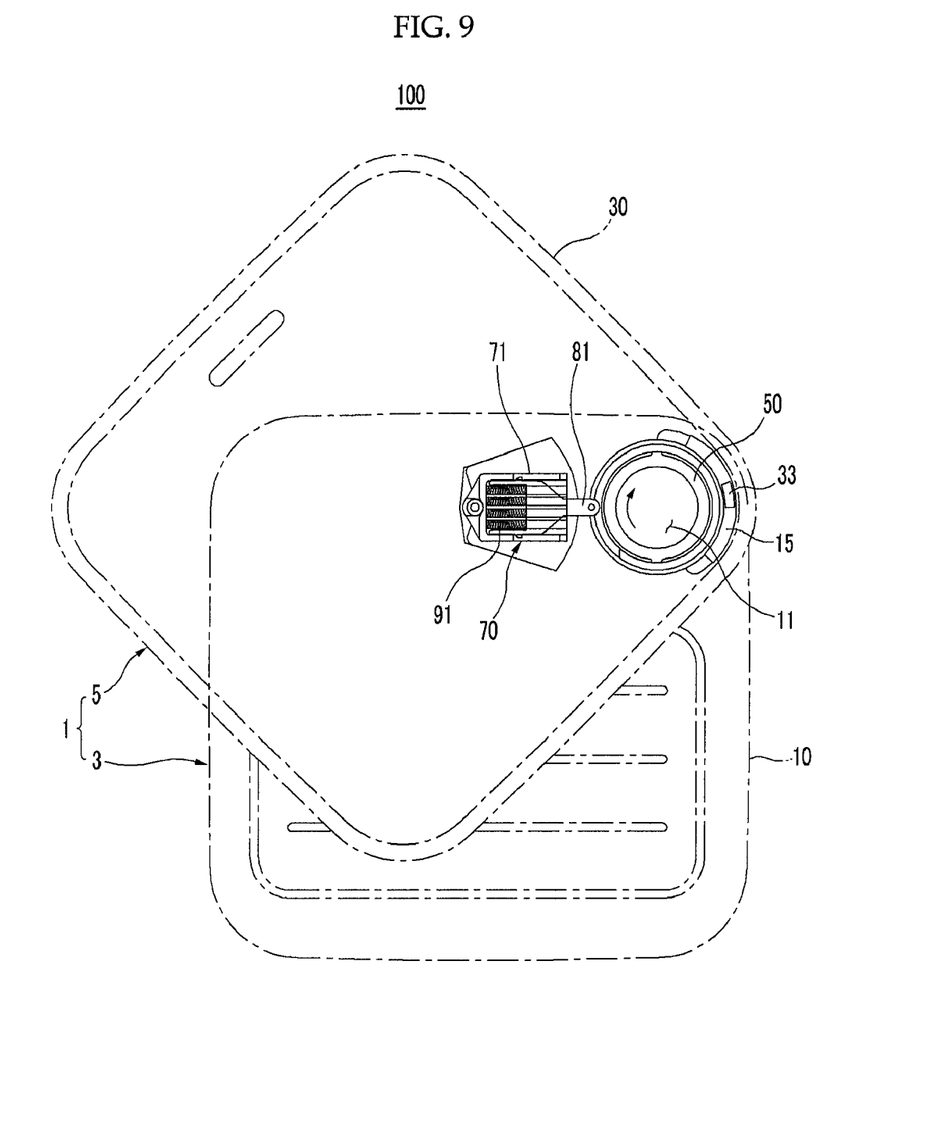
FIG. 9 is a plan view illustrating a state in which a cover of a mobile phone is opened at 90 degrees in a swing-type cover opening and closing device according to an exemplary embodiment of the invention.

In this state, as shown in FIG. 9, when pivotal force is applied to the cover 5 in the clockwise direction, the cover 5 starts to pivot around the hollow shaft 31 of the cover case 30.

In this process, the cover 5 pivots until the cover 5 opens approximately half (approximately 90 degrees) from the main body 3.

That is, since the pivot support member 50 is joined to the cover case 30 while being pivotably supported on the main body case 10, the cover 5 pivots in the clockwise direction while the stopper 33 of the cover case 30 slides on the rail part 15 of the main body case 10.

In this case, since the housing 71 and the slide member 81 of the elastic member 70 are hinge-joined to the main body case 10 and the cover case 30, respectively, the elastic unit 70 pivots in the counterclockwise direction by rotation of the cover 5.

Herein, the elastic unit 70 is positioned on the same line (vertex) as the center of the through-hole 11 of the main body case 10.

As described above, as the elastic unit 70 pivots together with the cover 5, the slide member 81 of the elastic unit 70 compresses the spring member 91 to the maximum.

The spring member 91 applies elastic restoration force thereof to the cover 5 through the slide member 81.

Figure 10:
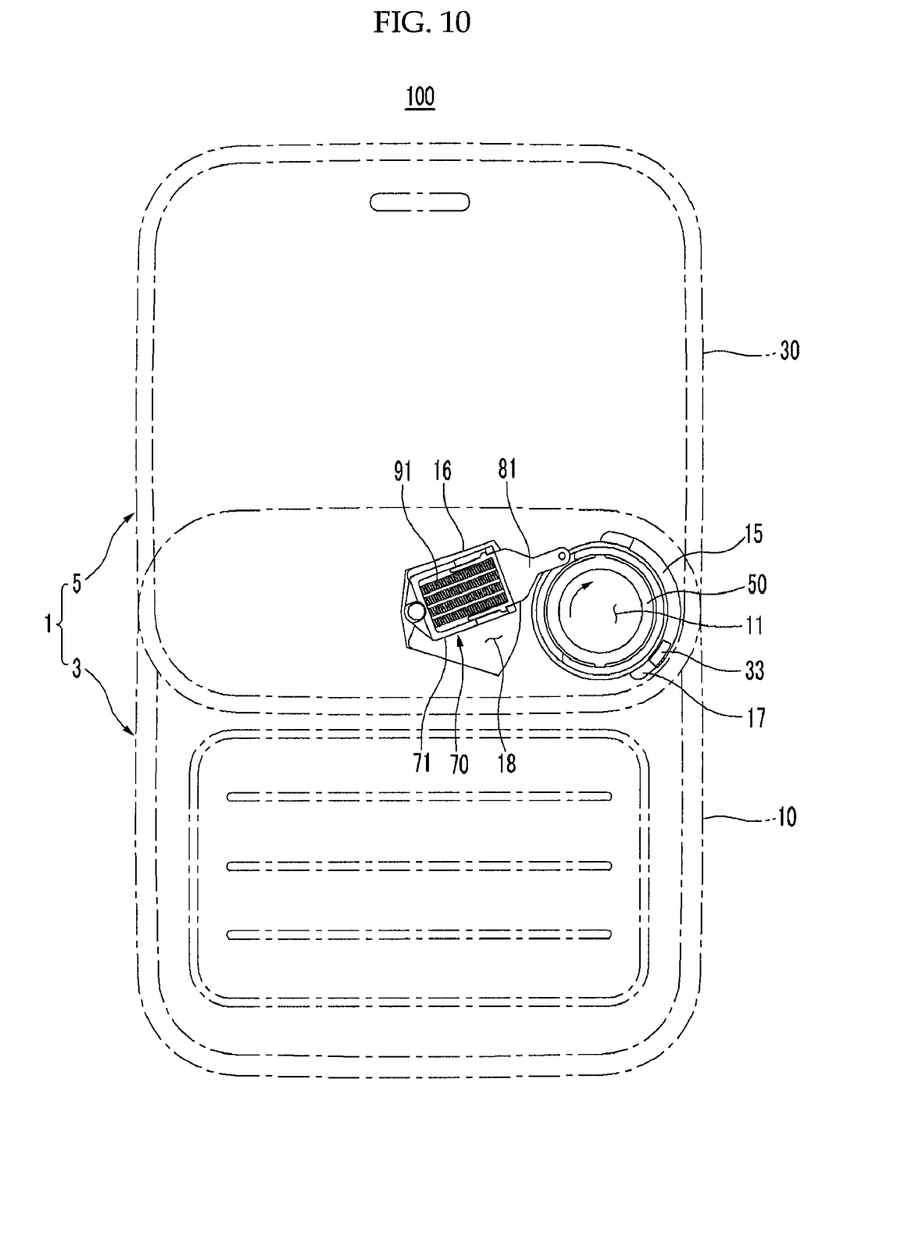
FIG. 10 is a plan view illustrating a state in which a cover of a mobile phone is opened at 180 degrees in a swing-type cover opening and closing device according to an exemplary embodiment of the invention.

Thereafter, when the user continuously applies the pivotal force to the cover 5, the cover 5 automatically pivots in the clockwise direction by the elastic restoration force of the spring member 91 provided to the slide member 81 even if the user does not apply the pivotal force to the cover 5 any longer at the moment when the elastic unit 70 travels on the same line as the center of the through-hole 11 as shown in FIG. 10.

Herein, the cover 5 pivots in the clockwise direction while the stopper 33 of the cover case 30 slides on the rail part 15 of the main body case 10. The stopper 33 pivots by 180 degrees while being suspended on the other projection 17 of the rail part 15.

In this process, the elastic unit 70 is stopped in the auxiliary stopper 16 of the main body case 10, i.e., the other hole end of the mounting hole 18, and the elastic force of the spring member 91 is loosen or released while the spring member 91 is restored similar to when the cover 5 is closed.

The elastic unit 70 slants in the other direction with respect to the pivotal direction of the cover 5.

Accordingly, in the present exemplary embodiment, the cover case 30 pivots while forming the pivot trajectory of 90 degrees with respect to the main body case 10, such that the cover 5 of the portable terminal 1 is fully opened while pivoting at 180 degrees from the main body 3.

As described above, a reason why the cover 5 pivots by 180 degrees while the cover case 30 forms the pivot trajectory of 90 degrees with respect to the main body case 10 is that the main body 3 and the cover 5 of the portable terminal 1 have the square and swing-type cover opening and closing device 100 according to the present exemplary embodiment disposed at the peripheries of the main body 3 and the cover 5 between the main body 3 and the cover 5.

Meanwhile, when the cover 5 is again closed in a state in which the cover 5 is fully opened, the cover 5 is full closed while each component operates in a reverse sequence to the opening operation of the cover 5 by applying the force to the cover 5 in the counterclockwise direction.

Therefore, in the present exemplary embodiment, unlike the related art of a surface-contact-type using a cam structure, the durability is improved and the cover 5 can be opened more smoothly and stably in the simple structure.

In the preset exemplary embodiment, the component for pivoting the cover 5 of the portable terminal 1 is integrally formed in the main body case 10 and the cover case 30, the elastic unit 70 is disposed in the main body case 10, and the mounting hole 18 mounts the elastic unit 70 on the main body case 10, such that the overall thickness of the device 100 is reduced. Therefore, it is advantageous to make the portable terminal 1 slim and light, and it is easy to design the portable terminal 1.

Figure 11:
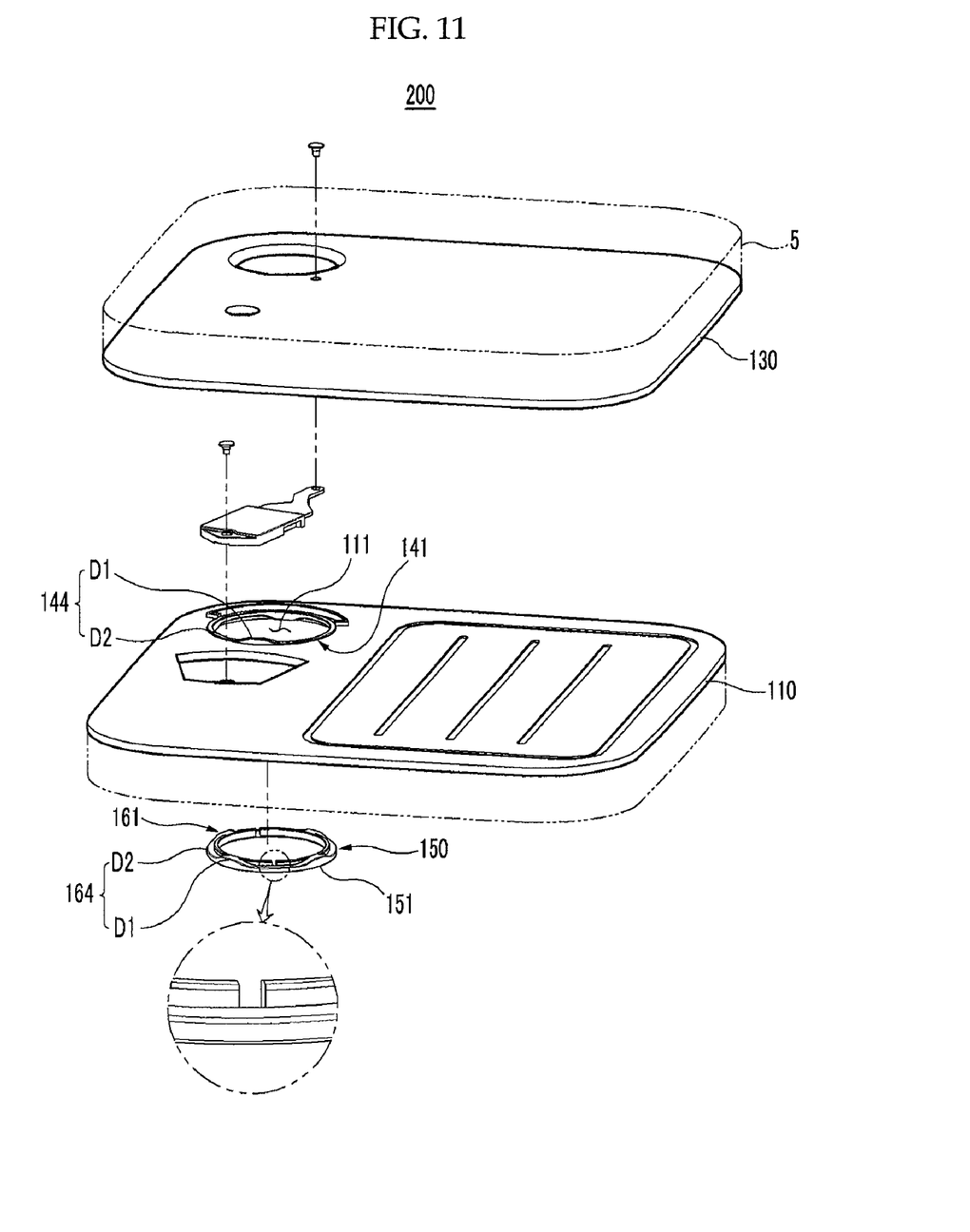
FIG. 11 is an exploded plan view illustrating a swing-type cover opening and closing device according to another exemplary embodiment of the invention.

FIG. 11 is an exploded plan view illustrating a swing-type cover opening and closing device for a mobile phone according to another exemplary embodiment of the invention.

Referring to FIG. 11, a swing-type cover opening and closing device 200 for a mobile phone according to the present exemplary embodiment basically includes the components of the above-described exemplary embodiment, and has a structure in which a cover case 130 can move up with respect to a main body case 110 when the cover case 130 pivots.

Figure 12:
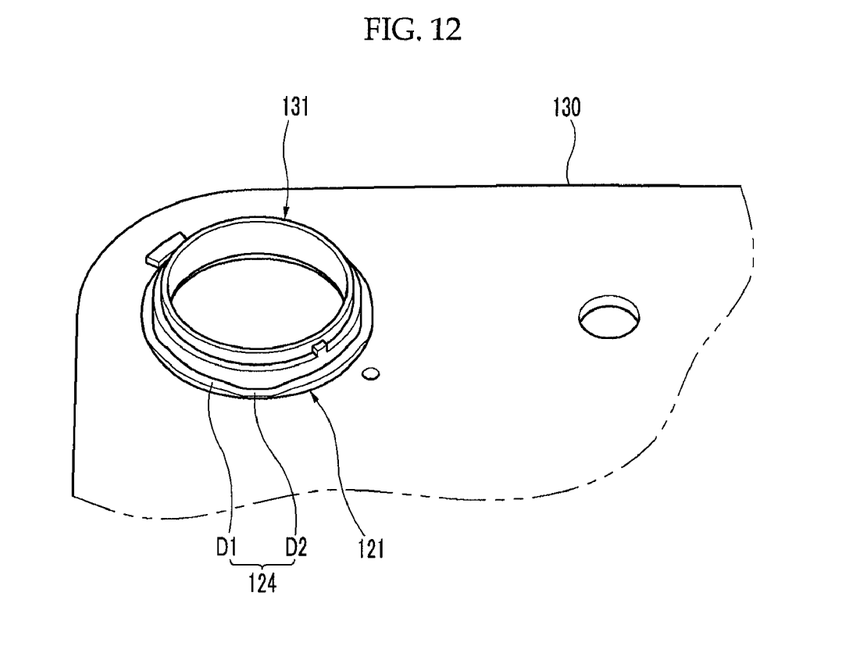
FIG. 12 is a perspective view illustrating a top surface of a cover case adopted in a swing-type cover opening and closing device according to another exemplary embodiment of the invention.

Therefore, as shown in FIG. 12, the cover case 130 includes a first cam unit 121 having a first cam surface 124, which is disposed on the outer periphery of a hollow shaft 131.

A main body case 110 includes a second cam unit 141 having a second cam surface 144 being in surface contact with the first cam surface 124, which is integrally disposed on the periphery of the top surface of a through-hole 111 in correspondence with the first cam unit 121.

Meanwhile, the swing-type cover opening and closing device 200 for the mobile phone according to the present exemplary embodiment has a structure in which a predetermined gap can be formed between the main body case 110 and the cover case 130 when the cover case 130 is opened or closed while the main body case 110 is opened and closed while moving up and down with respect to the main body case 110.

Therefore, in the present exemplary embodiment, a third cam unit 161 having a third cam surface 164 constituting the top surface of a support rib 151 is integrally formed in a pivot support member 150.

Figure 13:
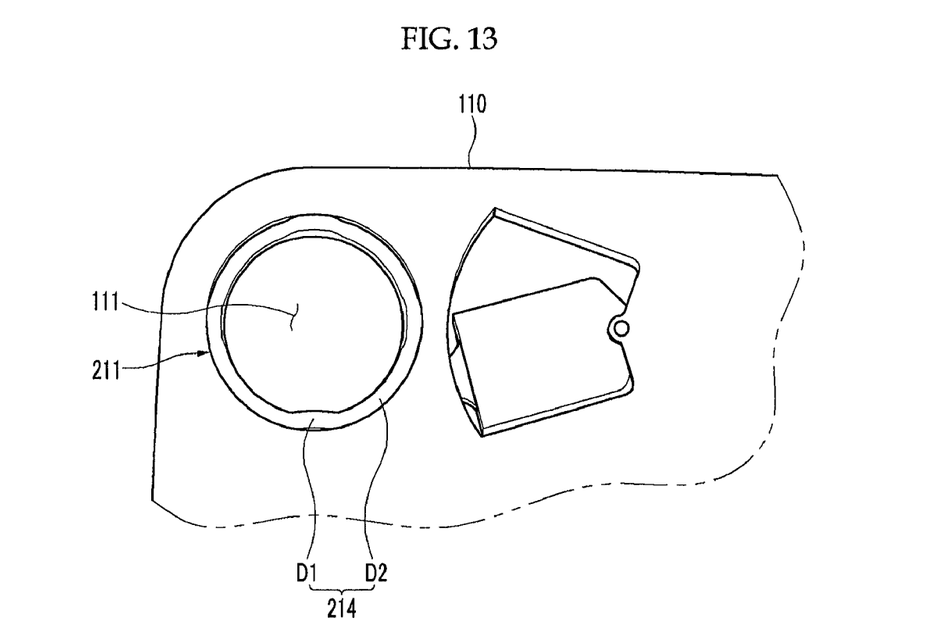
FIG. 13 is a perspective view illustrating a bottom surface of a cover case adopted in a swing-type cover opening and closing device according to another exemplary embodiment of the invention.

As shown in FIG. 13, the main body case 110 includes a fourth cam unit 211 having a fourth cam surface 214 being in surface contact with the third cam surface 164, which is integrally disposed on the periphery of a bottom surface of the through-hole 111.

Herein, each of the cam surfaces 124, 144, 164, and 214 has convex sections D1 at intervals of 90 degrees. Concave sections D2 are formed between the convex sections D1.

Accordingly, in the swing-type cover opening and closing device 200 for the mobile phone according to another exemplary embodiment of the invention, when a cover 5 is closed, the cam units 121 and 141 that are disposed in the cover case 130 and the main body case 110, respectively, have the cam surfaces 124 and 144 of which the convex sections D1 are in contact with the concave sections D2.

In this state, when the cover 5 pivots, the cover 5 moves up while the convex sections D1 of each of the cam surfaces 124 and 144 are in contact with each other.

In a case in which the cover 5 is fully opened, the cover 5 moves down while the convex sections D1 of each of the cam surfaces 124 and 144 are in contact with the concave sections D2.

When the cover 5 is again closed with the cover 5 fully opened, the cover 5 moves up and down in a reverse sequence to the opening operation of the cover 5.

Meanwhile, in the present exemplary embodiment, while the cover case 130 is opened and closed to the main body case 110 while moving up and down, the convex sections D1 of the cam surfaces 164 and 214 in the cam units 161 and 211 that are disposed in the pivot support member 150 and the main body case 110, respectively, slide to the concave sections D2 while being in contact with each other. As a result, a predetermined gap is formed between the main body case 110 and the cover case 130, thereby minimizing shaking of the cases 110 and 130.

The remaining components of the swing-type cover opening and closing device 200 for the mobile phone according to the present exemplary embodiment, and the combination structure and functions of the components, are the same as the above-described exemplary embodiment. Therefore, detailed descriptions thereof will be omitted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A swing-type cover opening and closing device for a mobile phone, comprising:
   a main body case that is disposed in a main body of the mobile phone and has a through-hole formed at one side thereof;
   a cover case that is disposed in a cover of the mobile phone, has a hollow shaft penetrating the through-hole integrally projecting thereon, and is pivotably mounted on the main body case; and
   an elastic unit of which both ends are pivotably joined to the main body case and the cover case, respectively, to provide elastic force to the cover case by rotation of the cover case,
   wherein the elastic unit includes a housing that is pivotably connected to the main body case through a first hinge pin, a slide member pivotably joined to the inside of the housing to be slidable and lockable and that is connected to the cover case through a second hinge pin, and a plurality of spring members that are installed in the housing and apply elastic force to the slide member.

2. The swing-type cover opening and closing device of claim 1, wherein a circular rail part forming a trajectory of 90 degrees or more is formed on the periphery of the through-hole and projections are formed at both ends of the rail part, in the main body case, and
   wherein a protrusion-type stopper sliding on the rail part is integrally disposed on the bottom surface of the cover case in correspondence with the rail part.

3. The swing-type cover opening and closing device of claim 1, further comprising
a ring-shaped pivot support member that fits in the hollow shaft through the through-hole while being pivotably supported on the periphery of the bottom surface of the through-hole.

4. The swing-type cover opening and closing device of claim 3, wherein a mount in which the pivot support member fits is formed in a circumferential direction of the hollow shaft of the cover case and at least one key protrusion is integrally formed in the mount, and
wherein a key groove joined to the key protrusion is formed on the inner peripheral surface of the pivot support member.

5. The swing-type cover opening and closing device of claim 3, wherein a support rib supporting the outer periphery of the bottom surface of the through-hole is integrally formed in the pivot support member.

6. The swing-type cover opening and closing device of claim 5, wherein a sliding groove to which the support rib is slidable is formed on the periphery of the bottom surface of the through-hole.

7. The swing-type cover opening and closing device of claim 1, wherein a mounting hole corresponding to a pivot trajectory of the housing is formed in the main body case to be penetrated therethrough.

8. The swing-type cover opening and closing device of claim 7, wherein the main body case further includes an auxiliary stopper that controls a predetermined pivot angle of the cover case, and the auxiliary stopper is composed of both hole ends of the mounting hole.

9. The swing-type cover opening and closing device of claim 1, wherein the housing, which has a plate shape, includes a plurality of spring mounting grooves for mounting each spring member successively formed in a width direction thereof, a guide groove that is joined to the slide member while being connected with each spring mounting hole, and a slit-type locking hole connected with the guide groove formed on both sides thereof.

10. The swing-type cover opening and closing device of claim 9, wherein the slide member has the plate shape, which fits in the guide groove and integrally includes a pair of support pins that fit in each spring member mounted in the spring mounting groove at both sides of the housing, and a locking protrusion joined to the locking hole is integrally formed in each support pin.

11. The swing-type cover opening and closing device of claim 1, wherein a first hinge hole and a second hinge hole for joining the first hinge pin are formed in the main body case and the housing, respectively, and a third hinge hole and a fourth hinge hole for joining the second hinge pin are formed in the cover case and the slide member, and the slide member is supported on the periphery of the top surface of the through-hole.

12. The swing-type cover opening and closing device of claim 1, wherein, in order to move the cover case up when the cover case pivots at a predetermined angle, a first cam unit having a first cam surface is integrally disposed on the outer periphery of the hollow shaft in the cover case, and
a second cam unit having a second cam surface being in surface contact with the first cam surface is disposed on the periphery of the top surface of the through-hole in correspondence with the first cam unit in the main body case.

13. The swing-type cover opening and closing device of claim 12, further comprising
a ring-shaped pivot support member integrally including a support rib that fits in the hollow shaft through the through-hole while being pivotably supported on the periphery of the bottom surface of the through-hole and supports the periphery of the bottom surface of the through-hole,
wherein in order to form a predetermined gap between the main body case and the cover case at the time of opening and closing the cover case, a third cam unit in which a top surface of the support rib is constituted by a third cam surface is formed and a fourth cam unit having a fourth cam surface being in surface contact with the third cam surface is integrally disposed on the periphery of the bottom surface of the through-hole corresponding to the third cam unit.

14. The swing-type cover opening and closing device of claim 13, wherein a mount in which the pivot support member fits in the first cam unit is formed on the hollow shaft of the cover case and at least one key protrusion is integrally formed in the mount, and a key groove joined to the key protrusion is formed on the inner periphery of the third cam unit in the pivot support member.

15. The swing-type cover opening and closing device of claim 13, wherein convex sections are formed on the cam surface of each cam unit at intervals of 90 degrees and concave sections are formed between the convex sections.

* * * * *